US 008788546B2

(12) United States Patent  
Beaule et al.

(10) Patent No.: US 8,788,546 B2  
(45) Date of Patent: Jul. 22, 2014

(54) PRELOADING RESOURCES FROM DATA CAROUSEL OF BROADCAST FILE SYSTEM

(75) Inventors: Stephane Beaule, Montreal (CA); John McCalla, Montreal (CA)

(73) Assignee: Bluestreak Technology Inc., Montreal (CA)

( * ) Notice: Subject to any disclaimer, the term of this patent is extended or adjusted under 35 U.S.C. 154(b) by 2470 days.

(21) Appl. No.: 11/195,971

(22) Filed: Aug. 3, 2005

(65) Prior Publication Data

US 2007/0033239 A1 Feb. 8, 2007

(51) Int. Cl.
*G06F 7/00* (2006.01)
*G06F 17/30* (2006.01)

(52) U.S. Cl.
USPC ............ 707/809; 707/812; 707/755; 707/803

(58) Field of Classification Search
USPC ......... 707/104.1, 10, 101, 809, 812, 755, 803
See application file for complete search history.

(56) References Cited

U.S. PATENT DOCUMENTS

| | | | |
|---|---|---|---|
| 5,666,293 A | 9/1997 | Metz et al. | |
| 5,951,639 A | 9/1999 | MacInnis | |
| 6,405,239 B1 | 6/2002 | Addington et al. | |
| 2002/0162112 A1* | 10/2002 | Javed | 725/87 |
| 2003/0105639 A1* | 6/2003 | Naimpally et al. | 704/276 |
| 2004/0117406 A1* | 6/2004 | Karaoguz et al. | 707/104.1 |
| 2004/0133923 A1* | 7/2004 | Watson et al. | 725/134 |
| 2004/0205829 A1* | 10/2004 | Hane, III. | 725/135 |
| 2006/0159117 A1* | 7/2006 | Furlong et al. | 370/432 |

OTHER PUBLICATIONS

International Search Report for PCT/US06/30238, dated Sep. 13, 2007.

* cited by examiner

*Primary Examiner* — Kuen Lu

(74) *Attorney, Agent, or Firm* — Hubbard Law PLLC

(57) ABSTRACT

An embedded processor device, communicating over a broadcast file system (BFS) with a data carousel, stores a file that specifies for one or more applications the application and all resource files required for at least start up of each application. Rather than reading a single application file from the BFS and then reading each of the resource files in a serial fashion, the embedded process or device concurrently reads the application file and any necessary resource files as they are broadcast, enabling all necessary files to be read during a single cycle of the data carousel.

22 Claims, 3 Drawing Sheets

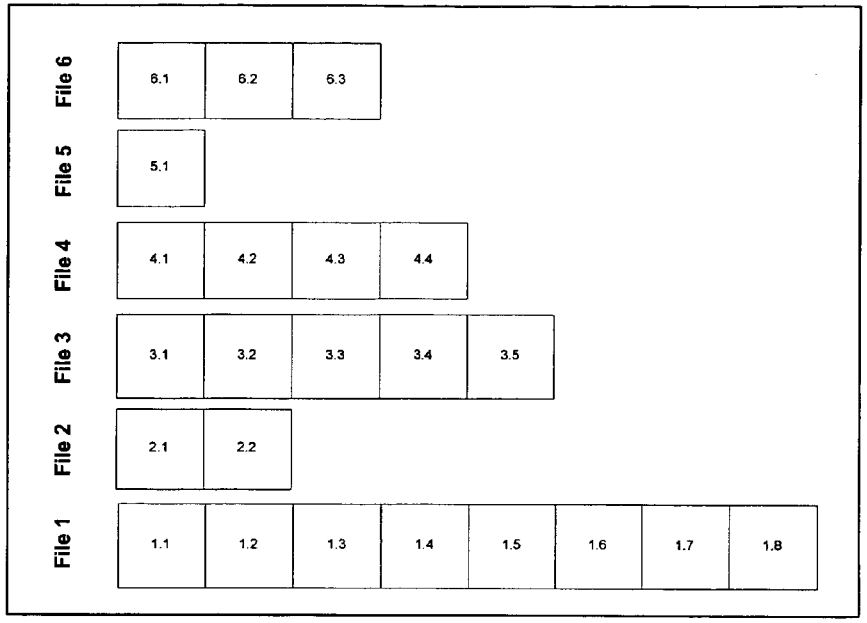
FIG. 3
Prior Art
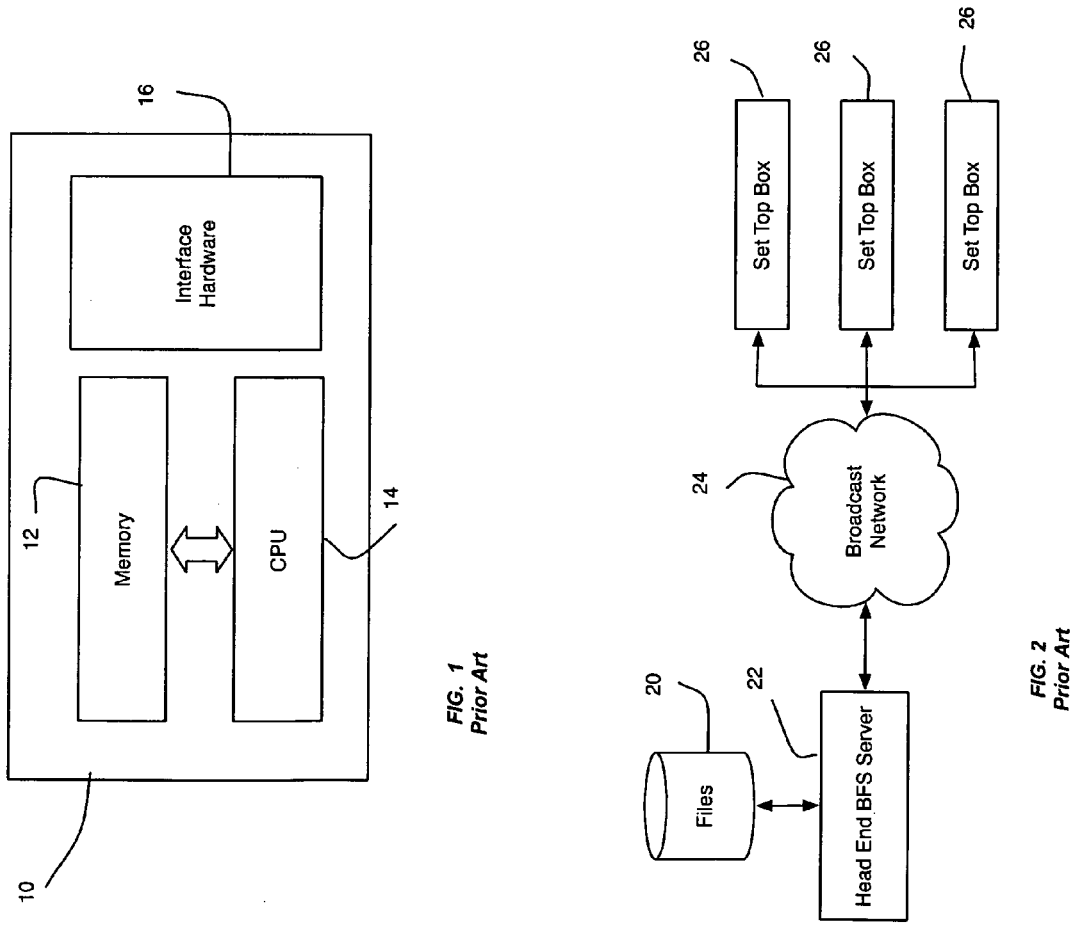
FIG. 1
Prior Art
FIG. 2
Prior Art

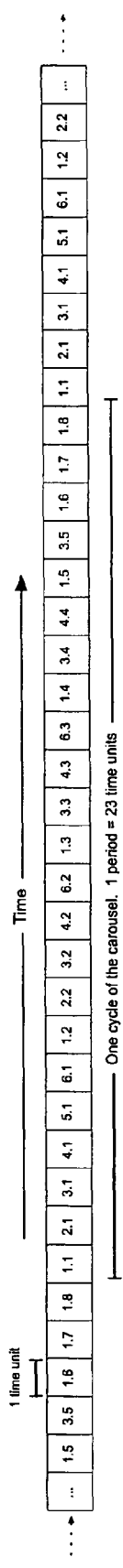
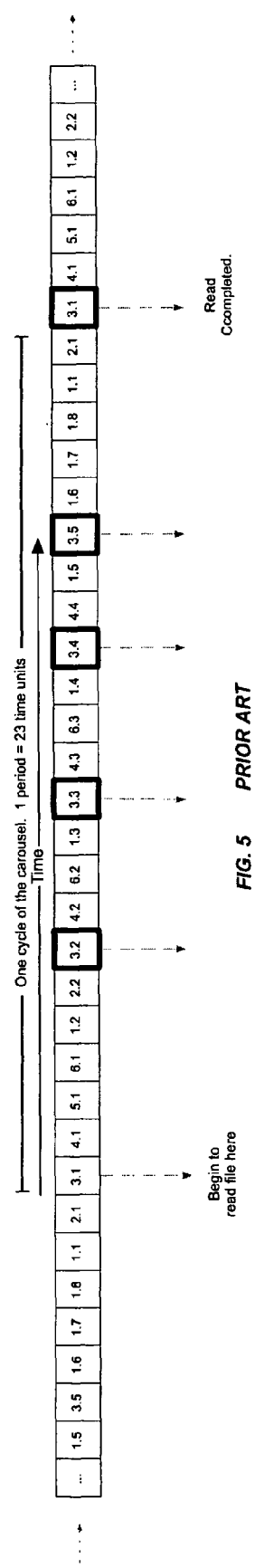
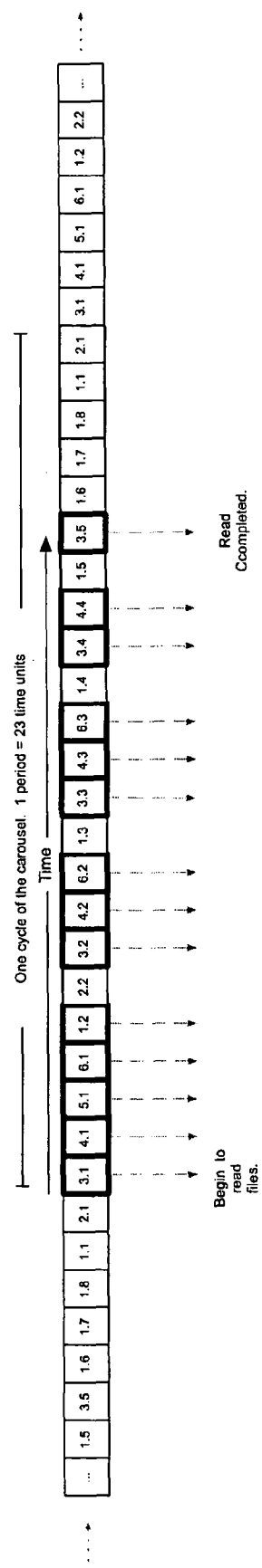
FIG. 4 PRIOR ART
FIG. 5 PRIOR ART
FIG. 6

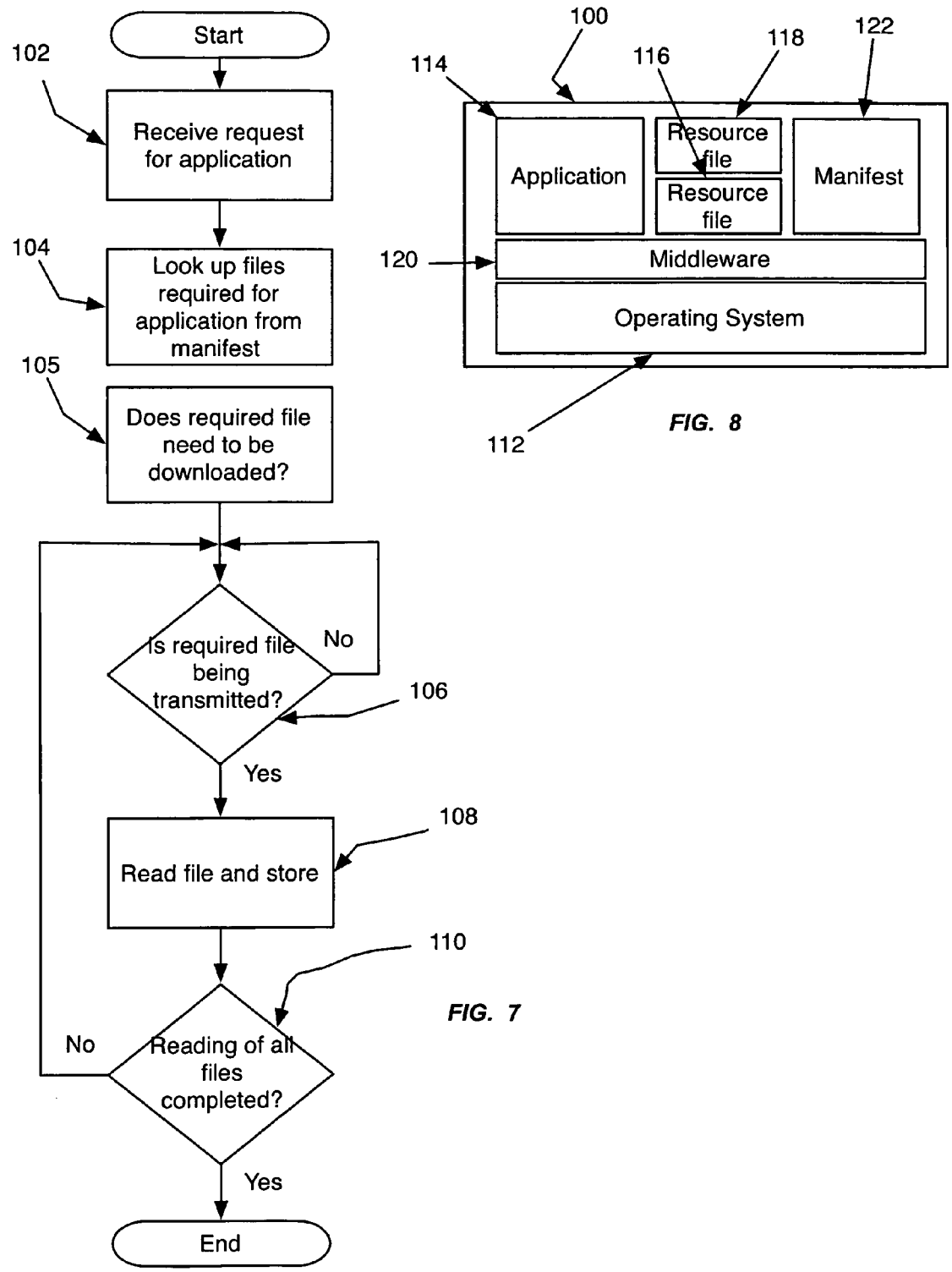

PRELOADING RESOURCES FROM DATA CAROUSEL OF BROADCAST FILE SYSTEM

BACKGROUND OF THE INVENTION

The invention relates generally to broadcast file systems, such as those used on cable television networks but which may also be used in satellite, IPTV, wireless and mobile networks).

A "set top box" refers to any type customer device or customer premise equipment used to tune and decode television signals transmitted over cable television and satellite networks, but may also mean devices for IPTV, wireless, and Mobile networks. A set top box may be implemented in any number of ways. For example, it may take the form of a discrete component or set of components, contained within its own case, or integrated with other components into a single device, such as a television set or mobile phone. All of its components may be mounted on one or more discrete circuit boards or on circuit boards shared with other components. Components may also be shared.

Referring to FIG. 1 which is a simplified, high-level, functional schematic diagram of a set top box 10, control functions of the set top box are implanted by software executing on an embedded processor 14 and stored in some type of memory 12. The memory can be volatile or non-volatile, and may include read only memory in addition to random access memory. The set top box also includes additional hardware, such as interface hardware 16 for receiving signals from a broadcast network, decoding the signal, and transmitting a video signal to a television set or other video output device. Typically, the embedded processor and memory have limited capabilities—just enough to run the necessary control software.

However, each newer generation of set top boxes possesses increased processing power and memory. Many are now capable of running additional applications for purposes of providing enhanced services to subscribers. Such set top boxes are loaded with operating systems to support the additional application software. They have evolved to resemble, at least in some, general purpose computing devices, albeit ones having limited processing and memory resources as compared to modern personal computers.

Nevertheless, memory resources typically remain limited for economic reasons. Set top boxes typically cannot store all the applications and data. Rather, it must be downloaded from a remote server on demand. When a user attempts to access or use an application, or request certain enhanced or additional services, the operating system downloads the application from a remote location, such as the head end in cable television network.

Referring to FIG. 2, certain cable, satellite, IPTV, wireless or mobile systems may employ a broadcast file system (BFS). Unlike a conventional computer network file system, a BFS transmits one file or file segment at a time on one or more channels to all of the set top boxes on a wired or wireless network or segment of a network. Therefore, a device with an embedded processor, such as a set top boxes on cable broadcast networks, do not request a BFS file. Rather, the device waits until the BFS file is broadcast and then store it in memory as it is being broadcast. When a BFS file is required, the device must wait for the file to be broadcast on the network.

In a typical BFS, files 20 are broadcast by a BFS server 22 over a network 24, such as a cable television network, on one or more channels to set top boxes 26. The files are transmitted in a cyclical fashion, using what is referred to as a data carousel. Generally, all files are transmitted at least once during a cycle, though it is possible for a file to be transmitted multiple times within one cycle.

To make more efficient use of the bandwidth, files are segmented before transmission. This is illustrated by the six example files of FIG. 3. Each of the six files is a different size and thus consist of different number of files segments. FIG. 4 illustrates an example of how these six files might be transmitted over the BFS in twenty-three segments. To broadcast the 6 files, each cycle would have at least 23 frames or time units, one for each of the 23 segments. The files segments are typically interleaved. An example of this scenario is illustrated by FIG. 5. Reading File 3, which has 5 segments, will take an entire cycle if reading begins during transmission of the first segment, which is labeled 3.1. In this example, segments 3.2 to 3.5 will be read before segment 3.1 is read, meaning the entire cycle of the data carousel will be transmitted before reading of file 3 is completed.

To the operating system of a set top box, an application may be associated with a single file. Therefore, when an application is requested by an action of a user, the operating system determines that the file containing the code module is available on the data carousel and begins "listening" for it. After completing the reading of all segments of a file, the operating system will "launch" it, causing the code in the downloaded file to begin to execute.

However, a typical application includes not only code, but also data, which is stored in one or more other files. Furthermore, an application may require additional files containing code libraries to run. Code libraries contain program code that may be shared with other application programs. Having application files use the same library files, rather than simply copying them into each application file, reduces cycle times of a data carousel.

Once an application loads, it requests the operating system to download any additional resource files, for example, data and/or code libraries—it requires. The application therefore must typically wait an additional carousel cycle for each resource file to be read before it is ready to present an interface to the user. As it is not uncommon for a BFS on a cable television network to require 20-40 seconds to complete a cycle, the delay in starting an application can irritate a user. The standard solution to reassuring a user that something has not gone wrong is for the set top box or application to display a message such as "Please wait while the application loads" on the screen.

SUMMARY OF THE INVENTION

The invention is directed generally to the problem of reducing the time for an embedded process or device to obtain multiple files from a data carousel. One example of a particularly advantageous application is in speeding up launching of applications on set top boxes for television distribution systems that utilize a broadcast file system.

In one example of a broadcast television system employing the teachings of the invention, each set top box stores or otherwise downloads a file or data listing that specifies for one or more applications the application file and one or more resource files for each application. Rather than reading a single application file from the BFS and then reading each resource file specified by the application, the set top box concurrently reads the application file and any necessary resource files, enabling all necessary files to be read during a single cycle of the data carousel.

BRIEF DESCRIPTION OF THE DRAWINGS

FIG. 1 is a simplified schematic diagram of an example of an embedded device, namely a set top box for a cable television system.

FIG. 2 is a simplified schematic diagram of an example of a cable television network utilizing a broadcast file system.

FIG. 3 is a representation of files that are segmented and stored for data carousel, broadcast file system.

FIG. 4. is a representation of the transmission order of segments of the files of FIG. 3 in a data carousel implementation of a broadcast file system.

FIG. 5 is also a representation of the transmission order of the segments of the files of FIG. 3 in a data carousel implementation of a broadcast file system.

FIG. 6 represents concurrent downloading of all the files from a broadcast file system necessary for launching of an application FIG. 7 is a flow diagram representing a high level process for concurrently reading from a data carousel on a broadcast file system multiple files required for launching application.

FIG. 8 is a schematic representation of the computing entities executing on a embedded device in connection with the process of FIG. 7.

DETAILED DESCRIPTION

FIG. 6 illustrates schematically a concept of downloading, during a single carousel cycle, more than one of the files needed by an application running on an embedded device, in communication with a broadcast network. In this example, files 3, 4, 5 and 6 are downloaded during a single carousel cycle. Files 1 and 2 are not required and therefore are preferably not downloaded.

Referring to FIG. 7, an embedded process or device, such as a set top box, receives a request for an application, as indicated by step 102. The request may have been initiated by a user, who may specify an application to be run through an interactive input application or menu, by another application or process, or by hardware (e.g., a button). The collection or list of files will be referred to as a manifest. At step 104, the process looks up or reads identifiers (such as name) for the files required to launch the application. Files required to run the application are identified in a data structure. If any of the files need to be downloaded, the embedded processor or device then starts to listen to the broadcasts on the network of the data carousel for identified files that are not stored in memory, as indicated by steps 105 and 106. Although not illustrated, the "no" loop associated with decision step 106 is preferably implemented using a mechanism to prevent endless looping, such as a counter or time-out mechanisms. In a preferred embodiment, files in already stored in memory are not downloaded. Files may, optionally, be downloaded even if in memory, such as when the file is specified as always required to be downloaded, when some predefined period of time has lapsed, when some event, time or date has occurred. When a segment of a file is broadcast, it reads and stores the segment, at step 108. Once all segments of the required files are downloaded at step 110, the process ends. Although not illustrated, the "no" loop associated with decision step 110 is preferably implemented using a mechanism to prevent endless looping, such as a counter or time-out mechanisms.

FIG. 8 is a schematic diagram representing programmed process entities running of the embedded process or device and data stored on the device. These entities are, for example, implemented using a processor, memory, and software (including program and data files) stored in memory and read and manipulated by the processor. Routine functions are handled by operating system 112. Application 114 represents an application process that is running on the embedded device. In this example, two resource files, 116 and 118, are loaded and used by the application. Middleware 120 represents a collection of software that provides additional functions or processes that the application 114, other applications or the operating system may utilize.

The process of FIG. 7 may be incorporated into the operating system, the middleware, an application, or another type of program. Its functions may also be distributed among more than one program.

Manifest 112, as previously explained, embodied as a data structure or as part of a data structure. It is preferably stored by the embedded device, but could be stored in another location and either downloaded or otherwise accessed by the embedded device. The data structure can be of any type, such as a file. The data structure may store information limited only to the manifest, or it may include, for example, a database or some other type of file containing other information in addition to the manifest. The manifest, or the data comprising it, may, optionally, be downloaded to the embedded device, such as during set up, initialization when it is changed or when it is needed. It may also be updated according a schedule or when the manifest changes.

What is claimed is:

1. Computer readable medium for storing instructions that, when read by one or more processors of an embedded device, instruct the one or more processors to perform the following in response to receiving a request for an application:
   read a data structure containing identifiers for a plurality of files to be downloaded for executing the application;
   monitor a broadcast file system for one or more segments of the plurality of files; and
   store on the embedded device the one or more segments of each of the plurality of files to be downloaded when broadcast on the broadcast file system.

2. The computer readable medium of claim 1, wherein the plurality of files includes at least one application file and at least one resource file for use by the application.

3. The computer readable medium of claim 1, wherein the plurality of files includes an application file and at least one resource file, at least one of the at least one resource files including a shared resource file that is shared with at least one other application.

4. The computer readable medium of claim 1, wherein the embedded device includes a set top box for a cable, IPTV, or satellite television broadcast system, or a mobile wireless device.

5. The computer readable medium of claim 1, wherein the data structure is read from a broadcast file system.

6. The computer readable medium of claim 5, wherein the data structure is read during a set up process for the embedded device.

7. The computer readable medium of claim 1, wherein the data structure is stored on the embedded device and updated from the broadcast file system.

8. Apparatus for preloading resources on an embedded device, comprising:
   means for reading a data structure containing identifiers for a plurality of files to be downloaded from a broadcast file system for executing an application in response to a request for launching the application;
   means for monitoring the broadcast file system for one or more segments of the plurality of files; and means for storing on the embedded device the one or more segments of each of the plurality of files to be downloaded when broadcast on the broadcast file system.

9. The apparatus of claim 8, wherein the plurality of files includes at least one application file and at least one resource file for use by the application.

10. The apparatus of claim 8, wherein the plurality of files includes an application file and at least one resource file, at least one of the at least one resource files including a shared resource file that is shared with at least one other application.

11. The apparatus of claim 8, wherein the embedded device is comprised of one of a set top box for a cable, IPTV, or satellite television broadcast system, or a wireless device.

12. The apparatus of claim 11 wherein the wireless device is selected from a group consisting of a mobile phone or a PDA.

13. The apparatus of claim 8, wherein the data structure is read from a broadcast file system.

14. The apparatus of claim 13, wherein the data structure is read during a set up process for the embedded device.

15. The apparatus of claim 8, wherein the data structure is stored on the embedded device and updated from the broadcast file system.

16. A method of a device with an embedded processor for downloading files from a data carousel on a broadcast file system comprising:
receiving a request for an application;
reading a data structure containing identifiers for a plurality of files required for the application;
determining whether any of the files required for the application are to be downloaded from the BFS;
monitoring a broadcast file system for the plurality of files identified in the data structure and not stored on the device; and
storing on the embedded device the one or more segments of each of the plurality of files to be downloaded when broadcast on the broadcast file system.

17. The method of claim 16, wherein the plurality of files includes at least one application file and at least one resource file for use by the application.

18. The method of claim 16, wherein the plurality of files includes an application file and at least one resource file, at least one of the at least one resource files including a shared resource file that is shared with at least one other application.

19. The method of claim 16, wherein the embedded device includes a set top box for a cable, IPTV, or satellite television broadcast system, or a mobile wireless device.

20. The method of claim 16, wherein the data structure is read from a broadcast file system.

21. The method of claim 16, wherein the data structure is read during a set up process for the embedded device.

22. The method of claim 16, wherein the data structure is stored on the embedded device and updated from the broadcast file system.

* * * * *